United States Patent Office  2,834,825
Patented May 13, 1958

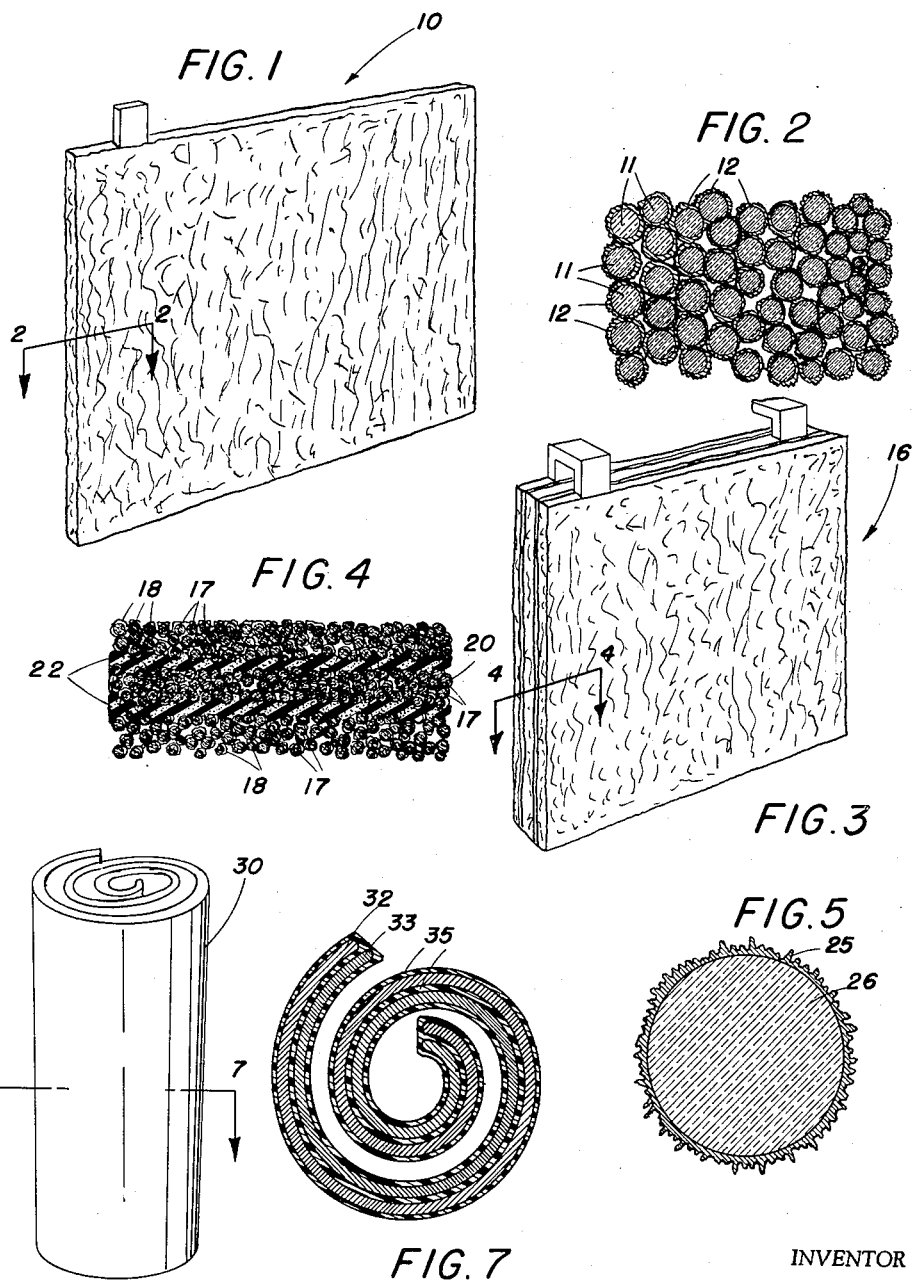

2,834,825

STORAGE BATTERIES, MORE PARTICULARLY STORAGE BATTERY PLATES AND METHOD OF MANUFACTURE

Elwood P. Wenzelberger, Dayton, Ohio, assignor to The Commonwealth Engineering Company of Ohio, Dayton, Ohio, a corporation of Ohio Application March 14, 1955, Serial No. 496,867

11 Claims. (Cl. 136—69)

This invention relates to storage batteries and more particularly to storage battery plates and methods of manufacturing the same.

Battery plates heretofore have been made largely from castings, suitable molds being employed into which molten metal is poured and set. The molds generally are adapted for casting a plurality of plates at a time, and then the casting is separated into individual plates. In place of molten metal, plates made of sintered powdered metal have been proposed.

A disadvantage inherent in such plates and casting methods is that the available surface area presented for contact with electrolyte is relatively small with respect to the total amount of metal in the plate. A further disadvantage is that alkaline accumulator plates made in the conventional manner described and used, for example, in the Edison type batteries, the efficiency of the plates is low. This is due principally to the fact that the battery plates do not present sufficient surface area to the electrolyte, especially in small size batteries.

A still further disadvantage is that the battery is too bulky and heavy.

The present invention provides a novel battery plate and method of making the same, which is light weight, and of relatively low cost as compared with prior cast or molded plates. In accordance with the present invention, the surface area of the battery plate is greatly enlarged so as to present the utmost surface area to the electrolyte, and yet provide a light weight compact battery.

Inorganic or refractory fibers such as glass fibers, mineral wool and the like provides the metal supporting surface. These fibers, individually or in the form of a mass, are plated with the desired metal by gaseous metal deposition. The refractory fibers, which are inert to electrolyte solution, may be woven into a metallized cloth or the refractory fibers merely felted and compressed together to form a mat. Plating may be carried out while the fibers are in the form of sheaves or bolts, and immediately after they are drawn or extruded from a molten mass, the residual heat being utilized to effect gaseous metal deposition. The plated fibers are woven, felted, or otherwise compacted and are suitably shaped to form a battery plate. The continuous length metal plated refractory fibers may be made and then cut to the desired plate size.

A principal object of the present invention consists in providing a porous, light weight plate for batteries and in which the plate may be made of iron, nickel, copper or the like, the same being formed by plating refractory fibers such as glass, or the like, and shaping the same into a plate.

A further object of the invention is to produce an improved battery plate which has increased electrolyte surface over the ordinary conventional type battery plates whereby a battery having the highest efficiency is produced.

A still further object of the invention is to provide an improved method of producing battery plates particularly plates formed of nickel, iron and the like, and useful in alkaline type Edison storage batteries.

These and other objects and advantages of the invention will become apparent from the following description taken in conjunction with the drawings wherein.

In the drawing:

Figure 1 shows a plate made in accordance with this invention comprising glass fibers which are metal coated by gaseous metal plating and compacted with a self-adhering fibrous plate as shown;

Figure 2 is a cross section of the plate taken on the line 2—2 of Figure 1;

Figure 3 is a modified plate comprising foam rubber in which glass fibers are loosely bonded, the fibers having been gaseous metal plated with nickel, iron or the like.

Figure 4 is a cross section taken on the line 4—4 of Figure 3;

Figure 5 is a sectional view illustrating on an enlarged scale a single refractory fiber having a porous metal coating or layer as produced by gas plating;

Figure 6 illustrates in perspective a roll type battery plate which is preferably made in long lengths and rolled up in the form of a spiral; and Figure 7 is a cross section taken on the line 7—7 of Figure 6.

Referring more particularly to Figures 1 and 2, there is shown a battery plate made of glass fibers coated with nickel. The plate generally designated 10 comprises glass fibers 11 which form a core or base for a gaseous metal coating of nickel metal 12, and which may be effected by heat-decomposing gaseous nickel carbonyl. Preferably the gas plating is carried out by subjecting the extruded glass fibers as drawn from the melting pot and while the same are hot. The fibers after being plated are gathered together and pressure molded to the desired shape battery plate as illustrated in Figure 2.

A hydraulic press or the like pressure-cladding means may be used to pressure mold the plates into the desired shape, the fibers being self-adhering to provide a semi-rigid relatively porous grid plate. Such a gaseous nickel plated glass fiber plate is utilized as the positive plate in a nickel-iron alkaline type battery. The negative iron plate is similarly constructed by gas plating iron on glass fibers. Iron carbonyl, in this instance, is used in place of nickel carbonyl as the gaseous metal compound.

In the Edison type nickel-iron alkaline battery it has been proposed to make the positive plate of nickeled-steel, tubes having been used which contain the positive active material. These tubes are inserted in the alkaline electrolyte and the active material is in the form of nickel hydrate but this changes to a nickel oxide after the formation treatment. The tubes are often perforated in order to allow the electrolyte free access to the active material. This active material is often alternated with layers of pure metallic nickel, usually in the form of flake or powder which is tamped into the tubes to obtain improved electrical conductance.

The negative plate is similarly constructed as the positive plate, except that finely divided iron oxide is used as the active material and is contained in rectangular perforated nickel steel pockets instead of tubes. In this type of cell an alkaline electrolyte is used such as a solution of potassium hydroxide (20% solution) to which is preferably added a small amount of lithium hydroxide.

In accordance with the preferred embodiment of this invention the positive plate comprises nickle plated glass fibers or the like refractory core material which may take the form of woven or spiralled tube-like shape or pressed into planar plate. Free access of electrolyte is provided to the active material nickel hydrate through the sheaves of metal plated fibers each of which are nickel plated, the plate providing a porous, honeycombed structure.

The negative plate is of similar construction as the positive plate, but comprises iron deposited by decomposition of iron carbonyl on the glass fibers. The nickeled glass fiber plates are positioned between the ironed glass fiber positive plates. In this type of storage battery cell the active material of the negative plate iron oxide (FeO) is reduced to iron. The active material of the positive plate nickel oxide (NiO) is oxidized to nickel dioxide. In the reverse process as on discharge, the negative plate becomes oxidized to iron oxide and the positive plate to nickel oxide. Throughout the charge and discharge of this type of cell the electrolyte solution remains substantially unchanged. Thus, provided evaporation does not occur, the specific gravity of electrolyte does not change with charge or discharge as takes place in the case of a lead acid cell.

In the plate structure shown in Figures 3 and 4, a plate generally designated 16 comprises glass fibers 17 coated with iron 18, and is utilized with nickel plated glass fibers 20. The mass of iron-plated fibers is separated from the nickel-plated fibers by a porous sponge rubber layer 22, as illustrated in Figure 4. The porosity may be on the order of about 0.01 inch or equivalent to the pore size of conventional wood separator plates as used in lead sulfate acid batteries.

The glass fibers in this instance are bonded together by the foamed rubber. Foamed synthetic rubber latex, e. g. butadienestyrene may be used. For a more detailed description of a method of making such foamed or sponge rubber reference may be made to U. S. Patent 2,598,127. Other suitable bonding agents may be used to loosely unite the metal plated fibers. For example, phenolformaldehyde resin or the like may be utilized. The bonding material generally comprises about 5 to 10% by weight of the fibrous mass, being merely sufficient to bond the fibers loosely together, e. g. at their intersecting points, to thereby form a honeycomb, or open plate structure which is pervious to the electrolyte but impervious to metal particles.

A mass of synthetic foamed rubber or resin and metal coated refractory fibers are placed in a mold and heat cured to the desired shape as by heating the same to 125 to 150° F. If desired, the foaming of the resin may be effected concurrently while shaping and heat curing the mass to form the battery plate. The metal plated glass fibers also may be molded into the surface of the sponge rubber or resin, thus providing an enlarged surface area for contact with electrolyte.

The plate surface is made up of a relatively porous metal fabrication as illustrated in the enlarged fragmentary sectional view of Figure 5. The gaseous metal plated plate structure comprises relatively thin, porous metal surfaces, as illustrated at 25, the metal coating adhering tenaciously to the surface of a core consisting of a refractory fiber body 26. In such a plate construction, the metal surface area available for electrolyte action is multiplied many times over that of a cast surface. Thus, maximum contact is provided for the battery plate with electrolyte. This, accordingly, greatly increases the efficiency of the cell.

In the modification illustrated in Figures 6 and 7, a spiral shaped battery plate 30 is provided. The cell plate structure, as shown in Figure 7, comprises plates 32 and 33 of gaseous nickel plated glass fibers and gaseous iron plated glass fibers respectively. The plates are enclosed in a sponge resin separator covering 35 which is permeable to electrolyte. The construction provides a compact high surface area battery plate.

Gaseous metal plating of glass fibers, or the like refractory fibers, is carried out so that a substantial thickness of the metal, e. g. nickel or iron is deposited thereon. The thickness of the metal may be on the order of 0.001 to 0.10 inch. The metal layer thickness, of course, may be increased or decreased as desired, depending upon the size of the battery and the shape and dimension of the plate required.

A preferred method comprises subjecting glass fibers as drawn from the molten glass mass in the melting pot to gaseous nickel or iron carbonyl. The hot glass fibers for example, may be moved through a closure in which gaseous metal carbonyl is circulated in contact with the glass fibers. A suitable method of gaseous metal plating thin metal layers on continuous length strips and the like is disclosed in U. S. Patents 2,344,138 and 2,701,901. Refractory fibers thus metal plated provide a lightweight battery plate which presents a maximum metal surface for contact with electrolyte. The plates are suitably separated in the battery cell by separator plates which may be fabricated of glass cloth or synthetic resin sheets.

The invention makes it possible to produce a battery grid plate structure which may be produced in long continuous lengths, and utilizing flexible foamed rubber or synthetic resin, etc. as a bonding agent whereby a screen or honeycomb like structure is provided. When utilizing iron as the metal for coating the fibers, iron carbonyl is preferably used as the decomposable gaseous metal compound as heretofore mentioned.

Refractory fibers coated after being drawn or blown in manufacture from the molten mass makes it possible to utilize the residual heat of the refractory fibers to decompose the gaseous metal compound. Coating of the fibers may also be effected by passing the cold fibers individually or in a woven felted or otherwise grouped condition and heated through a gaseous metal plating chamber, and such as disclosed in the aforementioned patents.

The gaseous metal plating may also be effected utilizing a mixture of metal carbonyl concurrently to provide an alloy coating. The coated refractory fibers may be bonded with synthetic resin or foamed rubber if desired, and in which the resin is incorporated in insufficient amount to fill up the interstices between the fibers but just sufficient to bond a portion of the fibers together to form a porous plate structure.

When the plates are made in long length strips of accumulated refractory fibers plated with gaseous metal, the plated fibrous mass may be rolled up into a spiral roll 20, as illustrated in Figure 6, thus providing a very large area for exposure to the electrolyte. A more compact plate is thereby provided by rolling the plate structure up in the shape of a spiral.

Resistance to passage of electric current of the metal plated glass fiber plates is very low, and the amount of metal deposited in each instance may be readily controlled to provide the desired depth or thickness of metal coating thereon. In this way the range in electrical ampere hours output for each cell may be predetermined in accordance with the requirements of a particular storage battery. The particular shape and size plate for the manufacture of different types of batteries can be varied to suit the conditions imposed and the battery requirements.

By thus increasing the active surface area of the plate, in accordance with this invention, a highly efficient battery is produced. A storage battery can be made to give unlimited ampere/hours output depending upon the number of or area of the plates. Utilizing the present invention it is thus possible to reduce the number of plates substantially yet obtain the same ampere hour output. Moreover, a battery of lighter weight and bulk is provided.

If desired, the battery plate may comprise gaseous metal plated refractory fibers matted together and rolled up in sandwich style, thus offering a tremendous amount of surface area in a relatively small space. The refractory material is resistant to alkali and acid electrolyte and thus constitutes an excellent base upon which the metal deposit can be received.

The invention may be utilized in the manufacture of other type battery plates, as for instance as used in Daniell battery, wherein copper and zinc plates are employed. Similarly, the invention may be utilized to increase the accumulator surface area of lead battery plates, as by the use of lead plated cores of refractory fibers as heretofore described for nickel-iron battery plates.

What is claimed is:

1. An accumulator plate for a storage battery comprising a plurality of refractory fibers having a porous metal surface, and a binding agent of sponge rubber latex bonding said metal plated fibers, said accumulator plate having a honeycomb structure which is permeable to electrolyte.

2. An accumulator plate comprising a plurality of refractory fibers having a porous metal surface, and a binding agent of sponge rubber latex bonding said metal plated fibers, said plate being rolled up in the shape of a spiral, said metal coated refractory fibers being loosely bonded to provide a lightweight accumulator plate which presents a maximum metal surface for contact with electrolyte.

3. A storage battery comprising at least a pair of accumulator plates, separator means comprising sponge rubber latex disposed between said plates, said plates comprising refractory fibers having a porous metal surface.

4. A storage battery comprising at least a pair of accumulator plates, separator means comprising sponge rubber comprising butadienestyrene disposed between said plates and loosely uniting the same and forming a honeycomb, open plate structure, said plate comprising refractory fibers coated with metal, and wherein one of said pair of plates consists of glass fibers having a porous surface of nickel and the other consisting of glass fibers having a porous surface of iron.

5. A storage battery comprising a plurality of accumulator plates and electrolyte, said plates comprising refractory fibers coated with metal and loosely bonded together with phenolformaldehyde resin to provide a semirigid relatively porous grid plate, said plates comprising positive and negative electrodes in the electrolye.

6. A storage battery structure as in claim 5, wherein the positive plate comprises glass fibers having a porous outer film of nickel and the negative plate comprises glass fibers having a porous outer film of iron.

7. A method of making storage battery accumulator plates comprising the steps of gaseous metal plating refractory filament material, binding said metal plated refractory filament material together with a porous synthetic resin, and shaping the resultant bonded material to provide a battery plate.

8. An accumulator plate for a storage battery comprising a mass of glass fibers each of which fibers are coated with a thin coating of metal and of a thickness of 0.001 to 0.10 of an inch, said metal plated glass fibers being bonded together loosely by foamed rubber latex, said metal plated fibers being loosely held together at their intersecting points to provide a honeycomb open plate structure which is pervious to electrolyte but impervious to metal particles.

9. A storage battery comprising an accumulator plate as set forth in claim 8, said battery comprising a plurality of said accumulator plates which are separated by sponge rubber disposed therebetween and separating said plates, one of said plates comprising a positive electrode and the adjacent plate a negative electrode.

10. A method of making storage battery accumulator plates as in claim 7, wherein the refractory material is glass fibers and wherein the gaseous metal plating deposits a coating of metal onto said glass fibers.

11. A method of making storage battery accumulator plates as in claim 7, wherein the refractory filament is composed of glass drawn from a molten mass of glass and said gaseous metal plating is carried out utilizing the residual heat in said drawn glass filaments to effect the gaseous metal plating of the filaments.

References Cited in the file of this patent

UNITED STATES PATENTS

| | | |
|---|---|---|
| 1,691,794 | Woodbridge | Nov. 13, 1928 |
| 1,831,406 | Beckmann | Nov. 10, 1931 |
| 1,929,923 | Howard et al. | Oct. 10, 1933 |
| 2,251,913 | Brennan | Aug. 12, 1941 |
| 2,361,378 | Brennan | Oct. 31, 1944 |
| 2,375,211 | Brennan | May 8, 1945 |
| 2,616,165 | Brennan | Nov. 4, 1952 |

FOREIGN PATENTS

| | | |
|---|---|---|
| 155,591 | Australia | Mar. 9, 1954 |